(12) United States Patent
Nyikos et al.

(10) Patent No.: US 10,348,787 B2
(45) Date of Patent: Jul. 9, 2019

(54) FLIGHT DATA RECORDER STREAMING (FDRS) SOLUTION

(71) Applicant: THE BOEING COMPANY, Chicago, IL (US)

(72) Inventors: Siobvan M. Nyikos, Chicago, IL (US); Amy Reiss, Chicago, IL (US); Michael de La Chapelle, Chicago, IL (US)

(73) Assignee: The Boeing Company, Chicago, IL (US)

( * ) Notice: Subject to any disclaimer, the term of this patent is extended or adjusted under 35 U.S.C. 154(b) by 708 days.

(21) Appl. No.: 14/838,113

(22) Filed: Aug. 27, 2015

(65) Prior Publication Data

US 2017/0063944 A1 Mar. 2, 2017

(51) Int. Cl.
| | |
|---|---|
| *G07C 5/00* | (2006.01) |
| *G07C 5/08* | (2006.01) |
| *B64D 45/00* | (2006.01) |
| *H04B 7/185* | (2006.01) |
| *H04L 29/06* | (2006.01) |

(52) U.S. Cl.
CPC .......... *H04L 65/4069* (2013.01); *B64D 45/00* (2013.01); *G07C 5/008* (2013.01); *G07C 5/085* (2013.01); *H04B 7/18508* (2013.01); *B64D 2045/0045* (2013.01); *B64D 2045/0065* (2013.01); *H04B 7/18506* (2013.01)

(58) Field of Classification Search
CPC ...................... B64D 45/00; B64D 2045/0065; B64D 25/20; B64D 2045/0085; B64D 2045/0045; B60T 8/171; G07C 5/008
USPC .......................................................... 709/219
See application file for complete search history.

(56) References Cited

U.S. PATENT DOCUMENTS

| | | | |
|---|---|---|---|
| 5,469,471 A | 11/1995 | Wheatley, III | |
| 5,469,472 A | 11/1995 | House et al. | |
| 5,712,712 A | 1/1998 | Sayward | |
| 6,385,513 B1 | 5/2002 | Murray et al. | |
| 6,487,289 B1 | 11/2002 | Phan et al. | |
| 6,549,162 B1 * | 4/2003 | Gage ................. | H04B 7/18508 342/353 |

(Continued)

OTHER PUBLICATIONS

Extended European Search Report, Pat. Appl. No. 16185888.1-1870, dated Dec. 15, 2016.

(Continued)

*Primary Examiner* — William G Trost, IV
*Assistant Examiner* — Imran Moorad
(74) *Attorney, Agent, or Firm* — Haynes and Boone LLP

(57) ABSTRACT

In one or more embodiments, the method for a streaming flight data from an aircraft involves transmitting, from a flight data unit(s), the flight data to a flight data recorder streaming (FDRS) server. The method further involves determining, by the FDRS server, at least one antenna to use for streaming the flight data by analyzing the flight data. Also, the method involves generating, by the FDRS server, an antenna selection signal according to the antenna(s) to use for streaming. In addition, the method involves transmitting, by the FDRS server, an antenna selection signal to an antenna switch unit. Additionally, the method involves selecting, by the antenna switch unit, the antenna(s) to use for streaming according to the antenna selection signal. Further, the method involves streaming, by the antenna(s) to use for streaming, the flight data to a satellite(s).

20 Claims, 5 Drawing Sheets

(56) References Cited

U.S. PATENT DOCUMENTS

| | | |
|---|---|---|
| 6,721,234 B2 | 4/2004 | Thomas |
| 7,042,392 B2 | 5/2006 | Whelan et al. |
| 7,372,400 B2 | 5/2008 | Cohen et al. |
| 7,468,696 B2 | 12/2008 | Bornholdt |
| 7,489,926 B2 | 2/2009 | Whelan et al. |
| 7,579,986 B2 | 4/2009 | DiEsposti |
| 7,554,481 B2 | 6/2009 | Cohen et al. |
| 7,579,987 B2 | 8/2009 | Cohen et al. |
| 7,583,225 B2 | 9/2009 | Cohen et al. |
| 7,619,559 B2 | 11/2009 | DiEsposti |
| 7,652,594 B2 | 1/2010 | Lamont et al. |
| 7,688,261 B2 | 3/2010 | DiEsposti |
| 9,009,796 B2 | 4/2015 | Gutt et al. |
| 2003/0135311 A1 | 7/2003 | Levine |
| 2003/0152145 A1* | 8/2003 | Kawakita ............... H04N 5/77 375/240.12 |
| 2003/0225492 A1* | 12/2003 | Cope ............... G07C 5/008 701/33.4 |
| 2005/0159891 A1 | 7/2005 | Cohen et al. |
| 2007/0268914 A1 | 11/2007 | Fisher et al. |
| 2008/0059059 A1 | 3/2008 | Cohen et al. |
| 2008/0143605 A1 | 6/2008 | Bornholdt |
| 2008/0146246 A1 | 6/2008 | Bornholdt |
| 2009/0174597 A1 | 7/2009 | DiLellio et al. |
| 2009/0228210 A1 | 9/2009 | Gutt |
| 2009/0254392 A1 | 10/2009 | Zander |
| 2009/0315764 A1 | 12/2009 | Cohen et al. |
| 2009/0315769 A1 | 12/2009 | Whelan et al. |
| 2010/0171652 A1 | 7/2010 | Gutt et al. |
| 2011/0007687 A1 | 1/2011 | Howe et al. |
| 2011/0016513 A1 | 1/2011 | Bailey, Jr. |
| 2012/0072990 A1 | 3/2012 | Gutt et al. |
| 2012/0191273 A1* | 7/2012 | Jacobs ............... H04B 7/18508 701/3 |
| 2013/0158751 A1* | 6/2013 | Cornell ............... G07C 5/008 701/14 |
| 2017/0141839 A1* | 5/2017 | Chiodini ............ H04B 7/18506 |

OTHER PUBLICATIONS

Sky High Connectivity with Airbus Defense and Space Services, Nov. 3, 2011, available at: http://www.space-airbusds.com/en/news2/sky-high-connectivity-with-airbus-defense-and-space-services.html.

FLYHTStream, FLYHT Aerospace Solutions Ltd., available on May 29, 2015, available at: http://flyht.com/solutions/flyhtstream.

Qatar Airlines Plans to Stream Flight Data from Planes, Mashable, Jan. 12, 2015, available at: http://mashable.com/2015/01/12/qatar-airways-flight-tracking/.

* cited by examiner

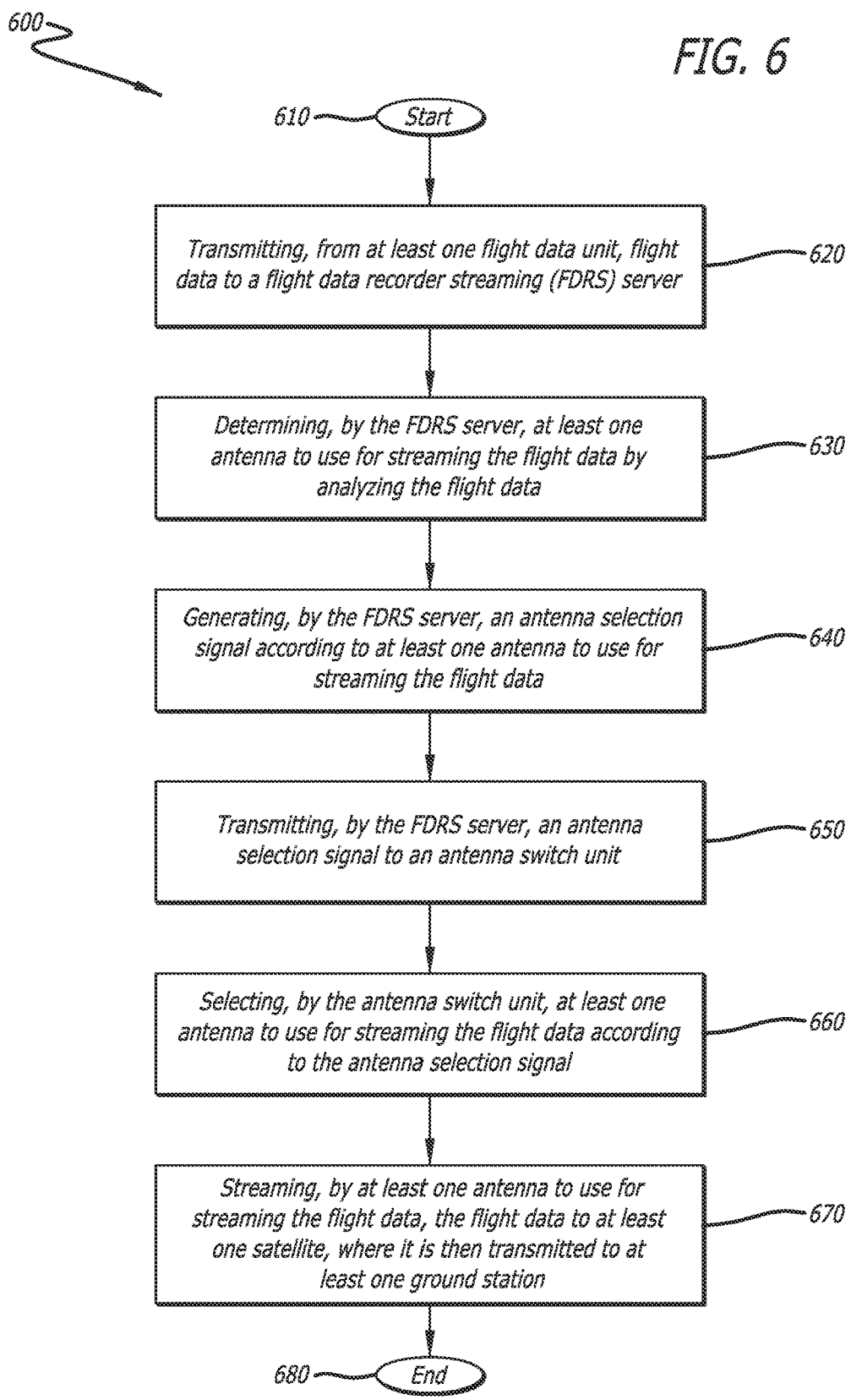

FLIGHT DATA RECORDER STREAMING (FDRS) SOLUTION

FIELD

The present disclosure relates to flight data recorders. In particular, it relates to flight data recorder streaming (FDRS) solutions.

BACKGROUND

Currently, with very few exceptions, flight data recorder (FDR) data is accessed on the ground. This is a problem because aircraft operations centers must depend on very infrequent Aircraft Communication Addressing and Reporting System (ACARS) messaging of position and failures for accident prevention as well as crash location and investigation, and even then, ACARS is only currently deployed on newer aircraft. Currently, there is no significant deployment of an FDR streaming solution from the air. It is not a basic provision on commercial airplanes. However, the national transportation safety board (NTSB) is now recommending FDRS capability for long flights over water. As such, there is need for FDRS solutions.

SUMMARY

The present disclosure relates to a method, system, and apparatus for flight data recorder streaming (FDRS) solutions. In one or more embodiments, a method for streaming flight data from an aircraft involves transmitting, from at least one flight data unit, the flight data to a flight data recorder streaming (FDRS) server. The method further involves determining, by the FDRS server, at least one antenna to use for streaming the flight data by analyzing the flight data. In one or more embodiments, at least one antenna comprises a first antenna and/or a second antenna. Also, the method involves generating, by the FDRS server, an antenna selection signal according to at least one antenna to use for streaming the flight data. In addition, the method involves transmitting, by the FDRS server, an antenna selection signal to an antenna switch unit. Additionally, the method involves selecting, by the antenna switch unit, at least one antenna to use for streaming the flight data according to the antenna selection signal. Further, the method involves streaming, by at least one antenna to use for streaming the flight data, the flight data to at least one satellite. In one or more embodiments, the flight data is then transmitted from at least one satellite to at least one ground station.

In one or more embodiments, at least one flight data unit is at least one of a flight data recorder (FDR) and/or a cockpit voice recorder/flight data recorder (CVR/FDR) combination recorder. In at least one embodiment, when at least one flight data unit is a FDR, the flight data is transmitted to the FDRS server via a digital flight data acquisition unit (DFDAU) playback bus or a FDR playback bus. In some embodiments, when at least one flight data unit is a CVR/FDR combination recorder, the flight data is transmitted to the FDRS server via an Ethernet hub or a CVR/FDR combination recorder playback bus.

In at least one embodiment, the first antenna is a crown antenna, and the second antenna is an undercarriage antenna. In some embodiments, the first antenna is a left saddlebag antenna, and the second antenna is a right saddlebag antenna.

In one or more embodiments, the FDRS server determines at least one antenna to use for streaming the flight data by analyzing the flight data to determine at least one antenna that has visibility to at least one satellite.

In at least one embodiment, the FDRS server determines at least one antenna to use for streaming the flight data by analyzing the flight data to determine whether at least one triggering condition has occurred. In some embodiments, when the FDRS server determines that at least one triggering condition has occurred, the FDRS server determines that both of the antennas are to be used for streaming the flight data.

In one or more embodiments, the method further involves determining, by the FDRS server, a data rate of transmission for streaming the flight data by analyzing the flight data to determine whether at least one triggering condition has occurred. In at least one embodiment, the triggering condition is at least one of following: a rate of descent threshold has been exceeded, an attitude threshold has been crossed, a collision warning threshold has been exceeded, the aircraft has been sabotaged, the aircraft is flying in an unexpected matter, an adverse security condition exists onboard the aircraft, and a deviation from a flight plan threshold has been exceeded. In some embodiments, when the FDRS server determines that at least one triggering condition has occurred, the FDRS server sets the data rate of transmission for streaming to a fast stream data rate of transmission. In one or more embodiments, when the FDRS server determines that at least one triggering condition has not occurred, the FDRS server sets the data rate of transmission for streaming to a slow stream data rate of transmission.

In at least one embodiment, a system for a streaming flight data from an aircraft involves at least one flight data unit to transmit the flight data to a flight data recorder streaming (FDRS) server. The system further involves the FDRS server to determine at least one antenna to use for streaming the flight data by analyzing the flight data (where at least one antenna comprises a first antenna and/or a second antenna); to generate an antenna selection signal according to at least one antenna to use for streaming the flight data; and to transmit an antenna selection signal to an antenna switch unit. Also, the system involves the antenna switch unit to select at least one antenna to use for streaming the flight data according to the antenna selection signal. Further, the system involves at least one antenna to use for streaming the flight data to stream the flight data to at least one satellite. In one or more embodiments, the flight data is then transmitted from at least one satellite to at least one ground station.

In one or more embodiments, the FDRS server is further to determine a data rate of transmission for streaming the flight data by analyzing the flight data to determine whether at least one triggering condition has occurred.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 6 is a flow chart depicting the disclosed method for streaming flight data from an aircraft, in accordance with at least one embodiment of the present disclosure.

DESCRIPTION

Figure 1:
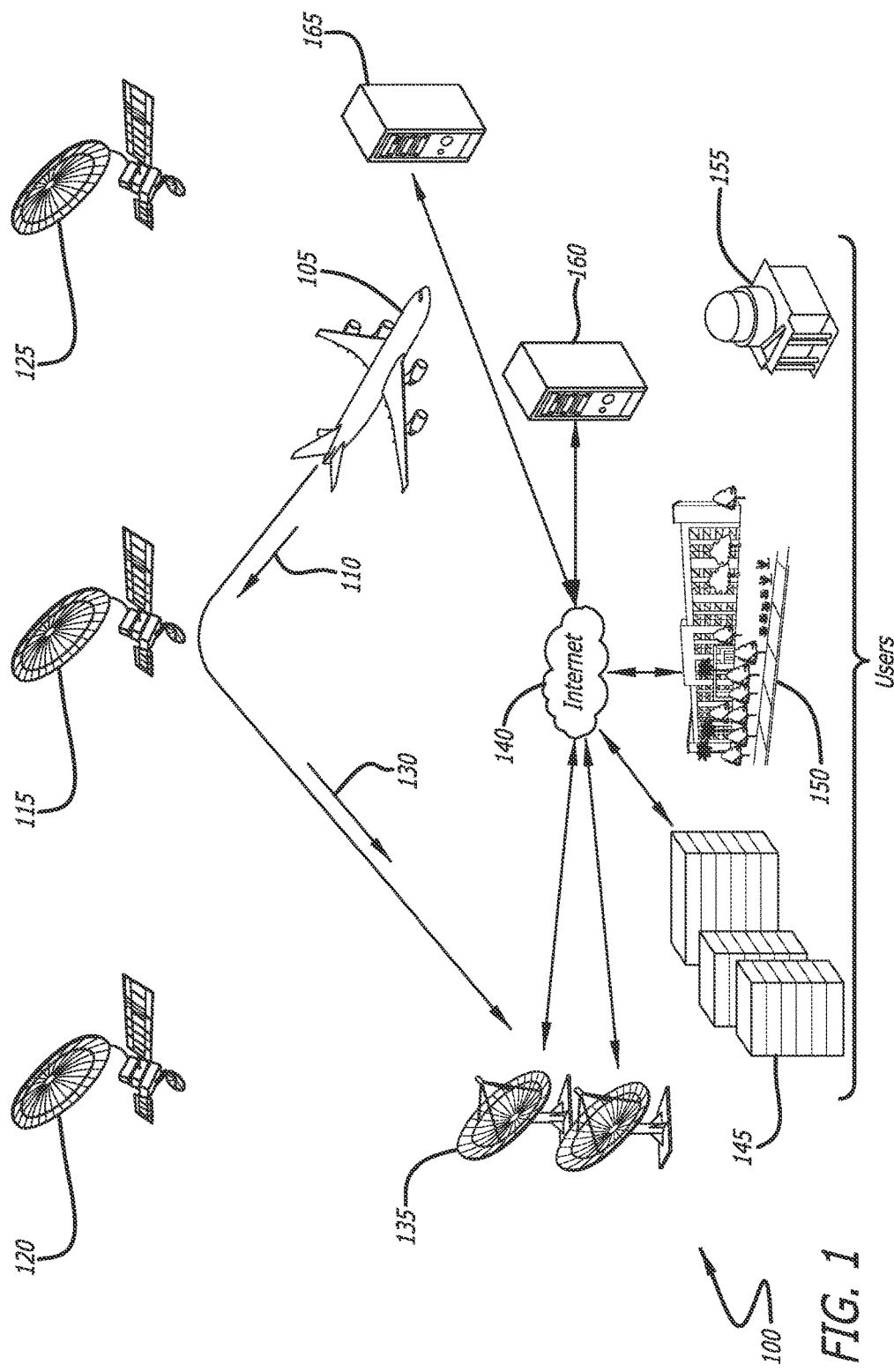
FIG. 1 is a diagram depicting the disclosed system for streaming flight data from an aircraft, in accordance with at least one embodiment of the present disclosure.

The methods and apparatus disclosed herein provide an operative system for flight data recorder streaming (FDRS) solutions. The system of the present disclosure teaches a streaming solution that employs a dual antenna configuration on the aircraft for streaming of the flight data to at least one satellite, where it is then transmitted to at least one ground station. In addition, the system utilizes varied data rates for streaming of the flight data depending upon the occurrence of at least one triggering condition.

In one or more embodiments, the disclosed system utilizes at least one geostationary earth orbit (GEO) satellite (e.g., Inmarsat). In some embodiments, the disclosed system utilizes at least one low earth orbit (LEO) satellite and/or at least one medium earth orbit (MEO) satellite. Also, in some embodiments, the disclosed system utilizes at least one satellite in a circular orbit and/or at least one satellite in an elliptical orbit. The disclosed system can be installed on production commercial aircraft to stream selected FDR parameters to capture anomalous events (e.g., the flight data includes information relating to inflight equipment issues) and safety incidents and to geolocate a crash site (e.g., the flight data includes tracking information) in a timely manner. In some embodiments, the disclosed system can be installed on production commercial aircraft to stream information from a cockpit voice recorder (CVR) onboard the aircraft. While the disclosed system is related to safety, the implementation of the disclosed system will not encumber the safety critical systems and interfaces of the aircraft. To speed deployment, the system will require little regulatory approval or industry-wide coordination, and be developed as a non-standardized unique solution. It should be noted that the disclosed system is neither a replacement for current flight data recorders (FDRs) nor a solution for streaming cockpit voice recorders (CVRs).

In at least one embodiment, the disclosed system employs a triggering solution. For the triggering solution, the disclosed system utilizes a slow stream (i.e. a slow data rate) of a minimum set of parameters continuously during flight; with the exception of the latitude, longitude, and altitude parameters, which will be streamed at a fast stream (i.e. a fast data rate, which is a faster data rate than the slow data rate). When a FDRS server determines that a triggering condition has occurred, the disclosed system utilizes a fast stream (i.e. a fast data rate) of a full set of parameters continuously during flight.

In one or more embodiments, the disclosed system employs a dual antenna configuration for the streaming of the flight data. The FDRS server determines, by analyzing the flight data, whether to employ a first antenna and/or a second antenna of the dual antenna configuration for the streaming of the flight data depending upon the visibility of at least one satellite to the antennas and/or depending upon whether a triggering condition has occurred.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to streaming flight data, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 depicting the disclosed system for streaming flight data from an aircraft, in accordance with at least one embodiment of the present disclosure. In this figure, at least one antenna (not shown) on an aircraft 105 is transmitting (i.e. streaming) 110 flight data to a satellite 115. The satellite 115 is a member of a constellation of satellites (e.g., the constellation contains satellites 115, 120, 125). In one or more embodiments, the satellites 115, 120, 125 may be geostationary earth orbit (GEO) satellites, medium earth orbit (MEO) satellites, and/or lower earth orbit (LEO) satellites. In some embodiments, the satellites 115, 120, 125 are only GEO satellites, such as Inmarsat satellites.

Also in this figure, satellite 115 is transmitting 130 the flight data to at least one satellite ground station 135. The satellite ground station(s) 135 transmits the flight data via the internet 140 to airlines operations centers 145, to the aircraft manufacturer 150, to the government 155, to a secure server and portal device 160, and/or to a backup secure server and portal 165.

Figure 2A:
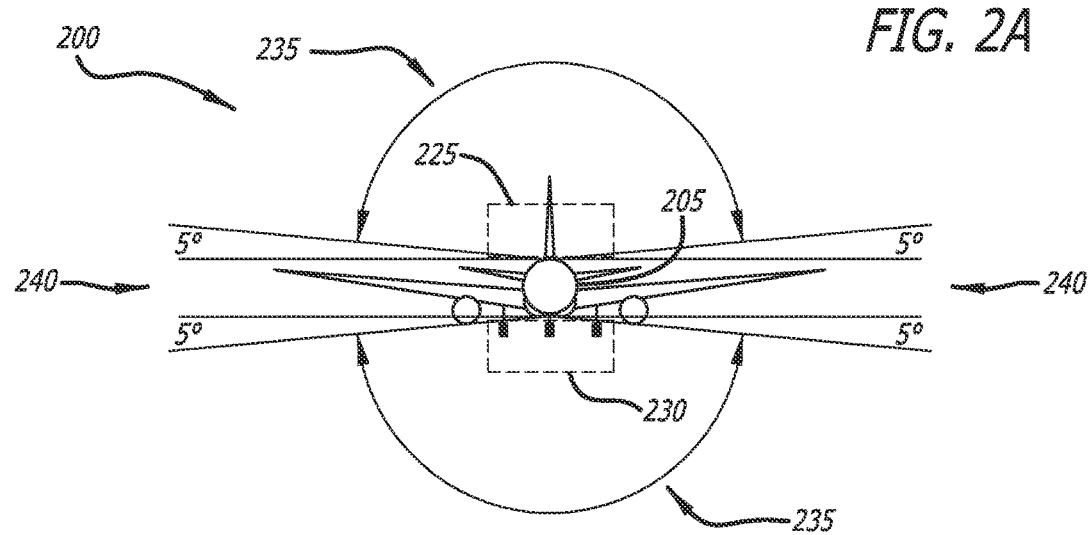
FIG. 2A is a diagram showing a dual antenna crown/undercarriage mounting that may be utilized for the antennas employed by the disclosed system for streaming flight data from an aircraft, in accordance with at least one embodiment of the present disclosure.

FIG. 2A is a diagram 200 showing a dual antenna crown/undercarriage mounting that may be utilized for the antennas 225, 230 employed by the disclosed system for streaming flight data from an aircraft 205, in accordance with at least one embodiment of the present disclosure. In this figure, an aircraft 205 is shown to have a crown antenna 225 and an undercarriage antenna 230. This figure shows the field of view 235 for each of these antennas 225, 230, and the blind spots 240 for this antenna configuration. The five (5) degree fields of views are example values.

Figure 2B:
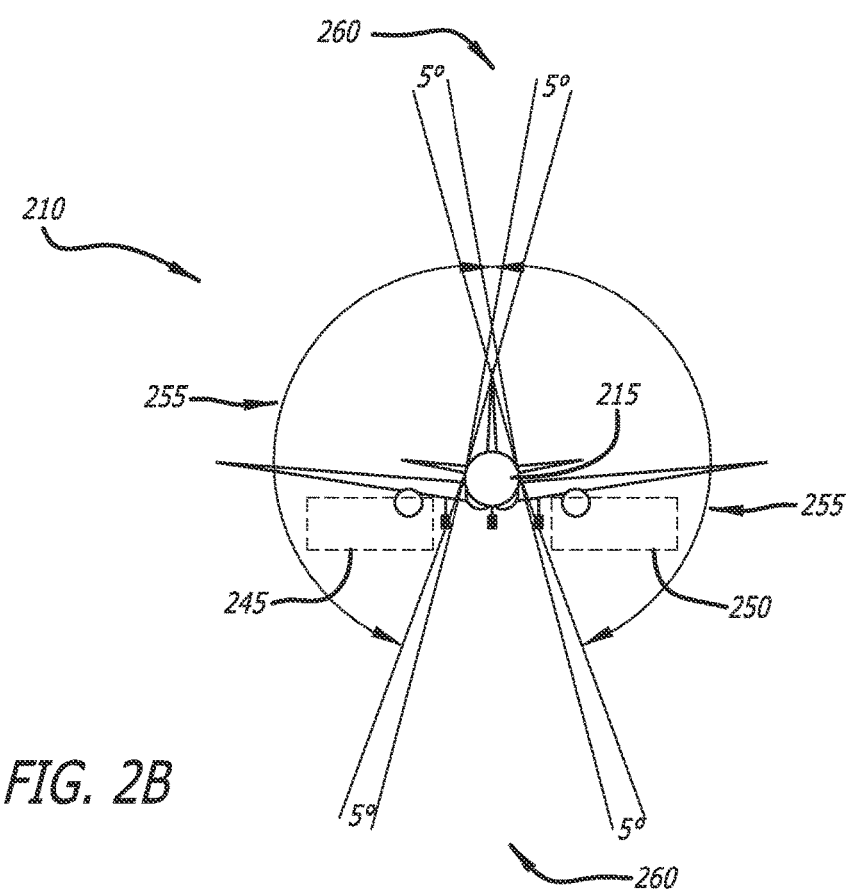
FIG. 2B is a diagram showing a dual antenna saddlebag mounting that may be utilized for the antennas employed by the disclosed system for streaming flight data from an aircraft, in accordance with at least one embodiment of the present disclosure.

FIG. 2B is a diagram 210 showing a dual antenna saddlebag mounting that may be utilized for the antennas 245, 250 employed by the disclosed system for streaming flight data from an aircraft 215, in accordance with at least one embodiment of the present disclosure. In this figure, an aircraft 215 is shown to have a left saddlebag antenna 250 and a right saddlebag antenna 245. This figure shows the field of view 255 for each of these antennas 245, 250, and the blind spots 260 for this antenna configuration. The five (5) degree fields of views are example values.

It should be noted that in other embodiments, the disclosed system for streaming flight data from an aircraft may utilize various different antenna configurations than the ones specifically disclosed in the present disclosure. In addition, it should be noted that the disclosed system for streaming flight data from an aircraft may employ various different types of aircraft including, but not limited to, commercial aircraft, helicopters, drones, and various different types of military aircraft.

Figure 3:
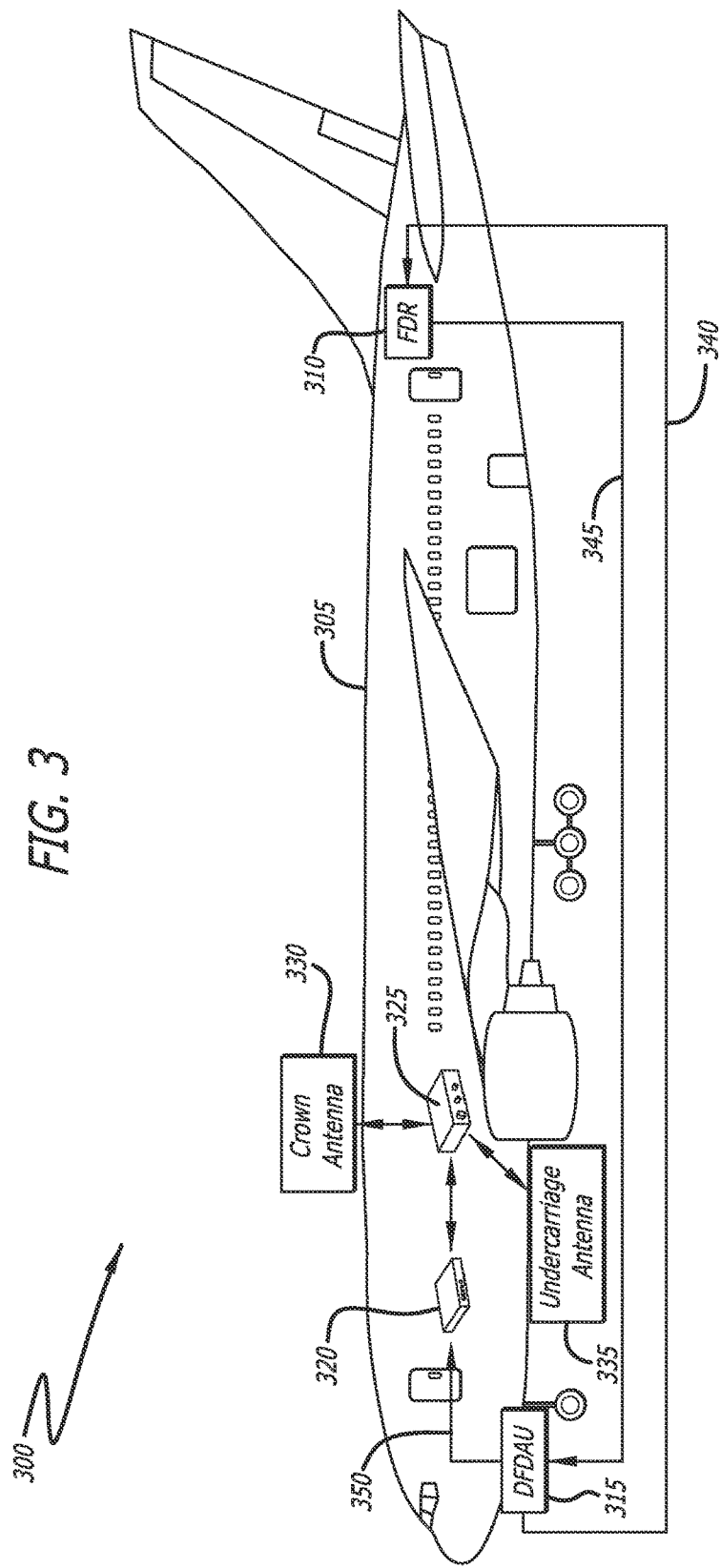
FIG. 3 is a diagram illustrating a cut-away view of an aircraft with an Aeronautical Radio Incorporated (ARINC) 717 interface employing the disclosed system for streaming flight data from an aircraft, in accordance with at least one embodiment of the present disclosure.

FIG. 3 is a diagram 300 illustrating a cut-away view of an aircraft 305 with an Aeronautical Radio Incorporated (ARINC) 717 interface employing the disclosed system for streaming flight data from an aircraft, in accordance with at least one embodiment of the present disclosure. In this figure, the aircraft 305 is shown to include a flight data recorder (FDR), located towards the aft section of the aircraft 305. The aircraft 305 is also shown to include a digital flight data acquisition unit (DFDAU) 315 located towards the forward section of the aircraft 305. Also, the aircraft 305 is shown to include a flight data recorder streaming (FDRS) server 320 and an antenna switch unit 325.

In this figure, the aircraft 305 is shown to employ a dual antenna crown/undercarriage mounting having a crown antenna 330 (e.g., a first antenna) and an undercarriage antenna 335 (e.g., a second antenna). However, it should be noted that in other embodiments, the aircraft may employ a dual antenna saddlebag mounting having a left saddlebag antenna (e.g., a first antenna) and a right saddlebag antenna (e.g., a second antenna).

During operation of the disclosed system, during flight, the DFDAU 315 sends flight data to the FDR 310 via a FDR ARINC 717 interface 340. The FDR 310 sends playback flight data back to the DFDAU 315 via an FDR playback bus 345. The DFDAU 315 also sends the flight data to the FDRS server 320 via a DFDAU playback bus 350. In some embodiments, the FDR 310 sends the playback flight data to the FDRS server 320 via the FDR playback bus 345.

After the FDRS server 320 has received the flight data from the DFDAU 315, the FDRS server 320 analyzes the flight data to determine which (or both) of the antennas 330, 335 to use for streaming of the flight data depending upon which antenna 330, 335 has visibility to at least one satellite, and/or depending upon whether at least one triggering condition has occurred. When the FDRS server 320 analyzes the flight data to determine which (or both) of the antennas 330, 335 to use for streaming of the flight data depending upon which antenna 330, 335 has visibility to at least one satellite; the FDRS server 320 will choose the antenna 330, 335 that has visibility to a satellite to stream the flight data. For example, if the FDRS server 320 analyzes the flight data to determine which (or both) of the antennas 330, 335 to use for streaming of the flight data depending upon which antenna 330, 335 has visibility to at least one satellite, and if the FDRS server 320 determines that antenna 330 has visibility to a satellite and antenna 335 does not have visibility to a satellite; the FDRS server 320 will determine to use antenna 330 for the streaming of the flight data.

When the FDRS server 320 analyzes the flight data to determine which (or both) of the antennas 330, 335 to use for streaming of the flight data depending upon whether at least one triggering condition has occurred; the FDRS server 320 will choose both antennas 330, 335 to stream the flight data when the FDRS server 320 determines that at least one triggering condition has occurred. Types of triggering conditions that may be employed by the disclosed system include, but are not limited to, a rate of descent threshold has been exceeded (e.g., the aircraft 305 is descending at a rate faster than the rate of descent threshold), an attitude threshold has been crossed (i.e. the aircraft 305 has an attitude outside of the expected attitude range), attitude and/or rate constraints have been violated (e.g., the aircraft is flying in an unstable or unexpected manner), the aircraft has been tampered with (e.g., the cockpit door, the electronic/electrical bay door, or particular onboard equipment has been sabotaged), a security alarm has gone off (e.g., an automatic alarm or an indication from a crew member or air marshal), specific crew alerts have been raised (e.g., engine out), a collision warning threshold has been exceeded (e.g., the aircraft 305 is closer to a foreign object than the threshold for safe distance), and/or a deviation from a flight plan threshold has been exceeded (e.g., the aircraft 305 has deviated from the flight plan more than an acceptable Circular Error Probability (CEP)). For example, if the FDRS server 320 analyzes the flight data to determine which (or both) of the antennas 330, 335 to use for streaming of the flight data depending upon whether a triggering condition has occurred, and if the FDRS server 320 determines that at least one triggering condition has occurred (e.g., the aircraft 305 has deviated from the flight plan more than the deviation from a flight plan threshold distance); the FDRS server 320 will choose both antennas 330, 335 to stream the flight data.

Also, after the FDRS server 320 has received the flight data from the DFDAU 315, the FDRS server 320 analyzes the flight data to determine a data rate of transmission for streaming the flight data depending upon whether at least one triggering condition has occurred. If the FDRS server 320 determines that at least one triggering condition has occurred, the FDRS server 320 will set the data rate of transmission for streaming to a fast stream data rate of transmission (i.e. a fast data rate) of a full set of parameters continuously during flight. However, if the FDRS server 320 determines that at least one triggering condition has not occurred, the FDRS server 320 will set the data rate of transmission for streaming to a slow stream data rate of transmission (i.e. a slow data rate, where the slow data rate is a data rate that is slower than the fast data rate) of a minimum set of parameters continuously during flight, with the exception of the latitude, longitude, and altitude parameters, which will be streamed at a fast stream data rate of transmission.

After the FDRS server 320 determines which (or both) antenna 330, 335 to use for streaming the flight data, the FDRS server 320 generates an antenna selection signal according to which (or both) antenna 330, 335 to use for streaming the flight data. The FDRS server 320 transmits the antenna selection signal to the antenna switch unit 325.

After the antenna switch unit 325 receives the antenna selection signal, the antenna switch unit 325 selects the antenna(s) 330, 335 to use for streaming the flight data according to the antenna selection signal. After the antenna(s) 330, 335 is selected by the antenna switch unit 325 to stream the flight data, the selected antenna(s) 330, 335 streams the flight data to at least one satellite (not shown).

Figure 4:
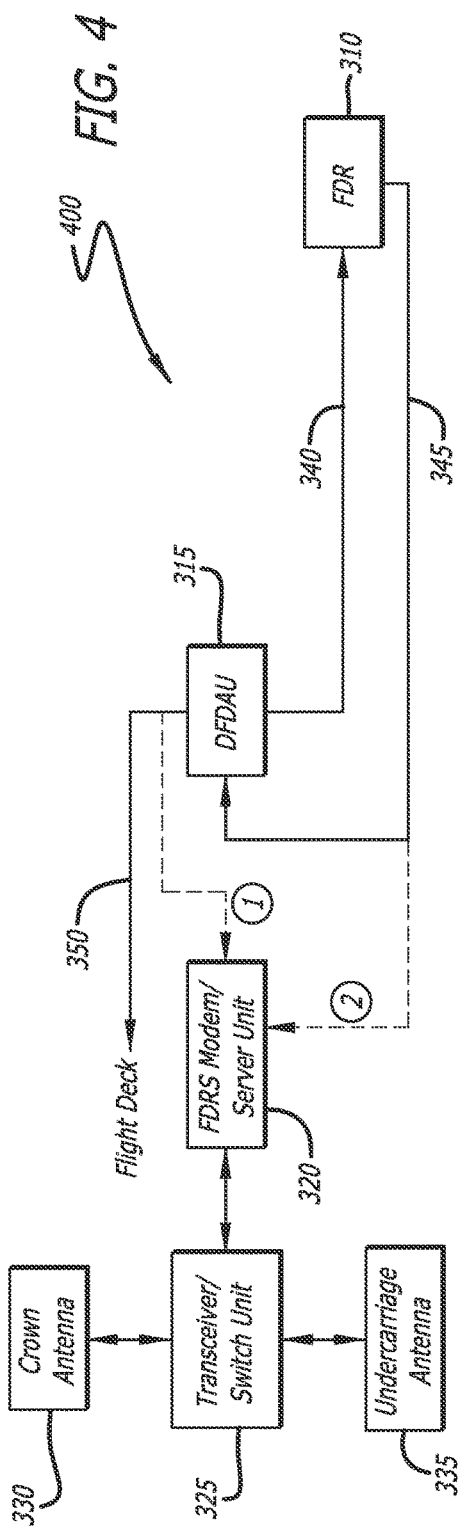
FIG. 4 is a detailed diagram showing the disclosed system for streaming flight data from an aircraft, where the aircraft employs an ARINC 717 interface, in accordance with at least one embodiment of the present disclosure.

FIG. 4 is a detailed diagram 400 showing the disclosed system for streaming flight data from an aircraft, where the aircraft employs an ARINC 717 interface, in accordance with at least one embodiment of the present disclosure. In particular, this figure shows a more detailed diagram than FIG. 3 of the interconnections between the various units employed by the disclosed system that employs an aircraft utilizing an ARINC 717 interface. In this figure, the flight data is shown to be transmitted to the FDRS server 320 via (1) the DFDAU playback bus 350 (from the DFDAU 315) and/or (2) the FDR playback bus 345 (from the FDR 310). The operation of the units depicted in this figure is discussed in the description of FIG. 3.

Figure 5:
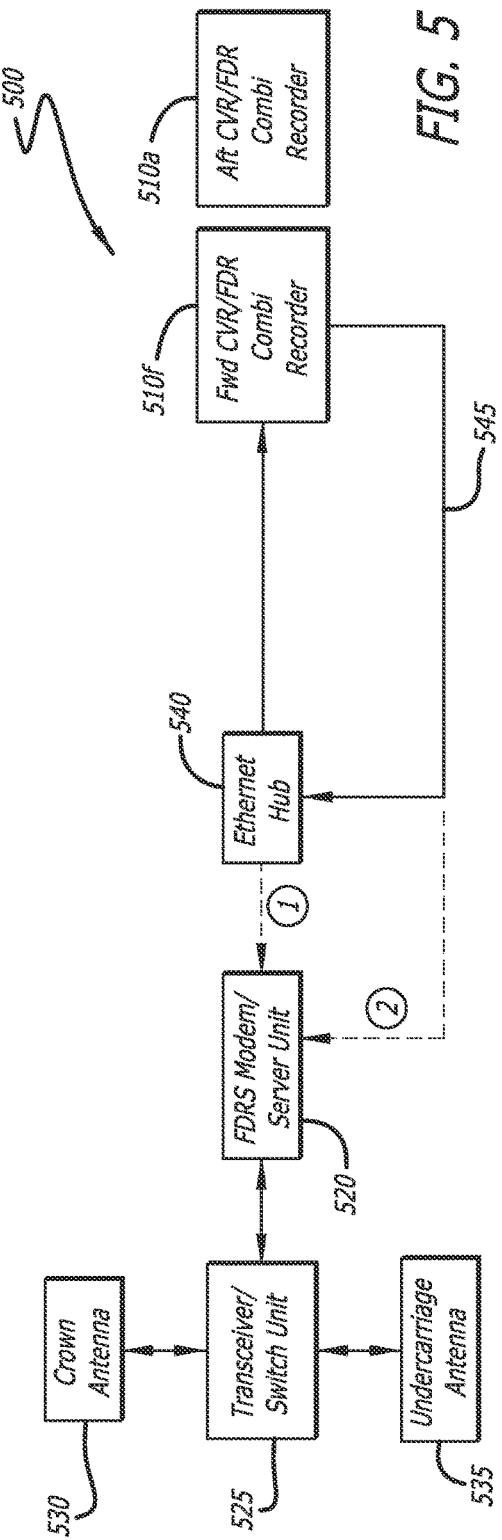
FIG. 5 is a detailed diagram showing the disclosed system for streaming flight data from an aircraft, where the aircraft employs an Ethernet interface, in accordance with at least one embodiment of the present disclosure.

FIG. 5 is a detailed diagram 500 showing the disclosed system for streaming flight data from an aircraft, where the aircraft employs an Ethernet interface, in accordance with at least one embodiment of the present disclosure. In this figure, the aircraft (not shown) includes a forward cockpit voice recorder/flight data recorder (CVR/FDR) combination recorder 510f, located towards the forward section of the aircraft, and includes an aft CVR/FDR combination recorder 510a, located towards the aft section of the aircraft. The aircraft also includes an Ethernet hub 540. Also, the aircraft includes a FDRS server 520 and an antenna switch unit 525.

In this figure, the aircraft employs a dual antenna crown/undercarriage mounting having a crown antenna 530 (e.g., a first antenna) and an undercarriage antenna 535 (e.g., a second antenna). However, it should be noted that in other embodiments, the aircraft may employ a dual antenna saddlebag mounting having a left saddlebag antenna (e.g., a first antenna) and a right saddlebag antenna (e.g., a second antenna).

During operation of the disclosed system, during flight, the Ethernet hub 540 sends flight data to the forward CVR/FDR combination recorder 510f and the aft CVR/FDR combination recorder 510a. The forward CVR/FDR combination recorder 510f and the aft CVR/FDR combination recorder 510a send playback flight data back to the Ethernet hub 540 via a CVR/FDR combination recorder playback bus 545. In this figure, the flight data is shown to be transmitted from the forward CVR/FDR combination recorder 510f and the aft CVR/FDR combination recorder 510a to the FDRS server 520 via (1) the Ethernet hub 540 and/or (2) the CVR/FDR combination recorder playback bus 545.

After the FDRS server 520 has received the flight data, the FDRS server 520 analyzes the flight data to determine which (or both) of the antennas 530, 535 to use for streaming of the flight data depending upon which antenna 530, 535 has visibility to at least one satellite, and/or depending upon whether at least one triggering condition has occurred. When the FDRS server 520 analyzes the flight data to determine which (or both) of the antennas 530, 535 to use for streaming of the flight data depending upon which antenna 530, 535 has visibility to at least one satellite; the FDRS server 520 will choose the antenna 330, 335 that has visibility to a satellite to stream the flight data.

When the FDRS server 520 analyzes the flight data to determine which (or both) of the antennas 530, 535 to use for streaming of the flight data depending upon whether at least one triggering condition has occurred; the FDRS server 520 will choose both antennas 530, 535 to stream the flight data when the FDRS server 520 determines that at least one triggering condition has occurred.

Also, after the FDRS server 520 has received the flight data, the FDRS server 520 analyzes the flight data to determine a data rate of transmission for streaming the flight data depending upon whether at least one triggering condition has occurred. If the FDRS server 520 determines that at least one triggering condition has occurred, the FDRS server 520 will set the data rate of transmission for streaming to a fast stream data rate of transmission (i.e. a fast data rate) of a full set of parameters continuously during flight. However, if the FDRS server 520 determines that at least one triggering condition has not occurred, the FDRS server 520 will set the data rate of transmission for streaming to a slow stream data rate of transmission (i.e. a slow data rate, where the slow data rate is a data rate that is slower than the fast data rate) of a minimum set of parameters continuously during flight, with the exception of the latitude, longitude, and altitude parameters, which will be streamed at a fast stream data rate of transmission.

After the FDRS server 520 determines which (or both) antenna 530, 535 to use for streaming the flight data, the FDRS server 520 generates an antenna selection signal according to which (or both) antenna 530, 535 to use for streaming the flight data. The FDRS server 520 transmits the antenna selection signal to the antenna switch unit 525.

After the antenna switch unit 525 receives the antenna selection signal, the antenna switch unit 525 selects the antenna(s) 530, 535 to use for streaming the flight data according to the antenna selection signal. After the antenna(s) 530, 535 is selected by the antenna switch unit 525 to stream the flight data, the selected antenna(s) 530, 535 streams the flight data to at least one satellite (not shown).

FIG. 6 is a flow chart depicting the disclosed method 600 for streaming flight data from an aircraft, in accordance with at least one embodiment of the present disclosure. At the start 610 of the method 600, at least one flight data unit transmits flight data to a flight data recorder streaming (FDRS) server 620. The FDRS server determines at least one antenna to use for streaming the flight data by analyzing the flight data 630. The FDRS server generates an antenna selection signal according to at least one antenna to use for streaming the flight data 640. The FDRS server transmits the antenna selection signal to an antenna switch unit 650. The antenna switch unit selects at least one antenna to use for streaming the flight data according to the antenna selection signal 660. At least one antenna to use for streaming the flight data streams the flight data to at least one satellite, where it is then transmitted to at least one ground station 670. Then, the method 600 ends 680.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

As a further example, embodiments may involve a FDRS application or algorithm (which may be run on a FDRS server onboard the aircraft or may be run on another computer at the operational center or elsewhere) that is a stand alone application, which may contain one or more programs, or that is part of another system or program.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for streaming flight data from an aircraft, the method comprising:
   transmitting, from at least one flight data unit, the flight data to a flight data recorder streaming (FDRS) server;
   determining, by the FDRS server, at least one antenna to use for streaming the flight data by analyzing the flight data, wherein the at least one antenna comprises at least one of a first antenna and a second antenna;
   generating, by the FDRS server, an antenna selection signal according to the at least one antenna to use for streaming the flight data;
   transmitting, by the FDRS server, the antenna selection signal to an antenna switch unit;
   selecting, by the antenna switch unit, the at least one antenna to use for streaming the flight data according to the antenna selection signal;
   determining, by the FDRS server, whether at least one triggering condition has occurred by analyzing the flight data;
   determining, by the FDRS server, a data rate of transmission for streaming the flight data based on whether the at least one triggering condition has occurred according to the flight data; and
   streaming, by the at least one antenna to use for streaming the flight data, the flight data at the data rate of transmission to at least one satellite.

2. The method of claim 1, wherein the at least one flight data unit is at least one of a flight data recorder (FDR) and a cockpit voice recorder/flight data recorder (CVR/FDR) combination recorder.

3. The method of claim 2, wherein when the at least one flight data unit is a FDR, the flight data is transmitted to the FDRS server via one of a digital flight data acquisition unit (DFDAU) playback bus or a FDR playback bus.

4. The method of claim 2, wherein when the at least one flight data unit is a CVR/FDR combination recorder, the flight data is transmitted to the FDRS server via one of an Ethernet hub or a CVR/FDR combination recorder playback bus.

5. The method of claim 1, wherein the first antenna is a crown antenna and the second antenna is an undercarriage antenna.

6. The method of claim 1, wherein the first antenna is a left saddlebag antenna and the second antenna is a right saddlebag antenna.

7. The method of claim 1, wherein the FDRS server determines the at least one antenna to use for streaming the flight data by analyzing the flight data to determine the at least one antenna that has visibility to at least one of the at least one satellite.

8. The method of claim 1, wherein when there are at least two of these antennas and the FDRS server determines that at least one of the at least one triggering condition has occurred, the FDRS server determines that all of the antennas are to be used for streaming the flight data.

9. The method of claim 1, wherein the at least one triggering condition is at least one of a rate of descent threshold has been exceeded, an attitude threshold has been crossed, a collision warning threshold has been exceeded, the aircraft has been sabotaged, the aircraft is flying in an unexpected matter, an adverse security condition exists onboard the aircraft, or a deviation from a flight plan threshold has been exceeded.

10. The method of claim 1, wherein when the FDRS server determines that at least one of the at least one triggering condition has occurred, the FDRS server sets the data rate of transmission for streaming to a fast stream data rate of transmission, which is at a faster data rate of transmission than a slow stream data rate of transmission.

11. The method of claim 1, wherein when the FDRS server determines that at least one of the at least one triggering condition has not occurred, the FDRS server sets the data rate of transmission for streaming to a slow stream data rate of transmission, which is at a slower data rate of transmission than a fast stream data rate of transmission.

12. A system for streaming flight data from an aircraft, the system comprising:
   at least one flight data unit to transmit the flight data to a flight data recorder streaming (FDRS) server;
   the FDRS server to determine at least one antenna to use for streaming the flight data by analyzing the flight data, wherein the at least one antenna comprises at least one of a first antenna and a second antenna, to generate an antenna selection signal according to the at least one antenna to use for streaming the flight data, to transmit the antenna selection signal to an antenna switch unit, to determine whether at least one triggering condition has occurred by analyzing the flight data, and to determine a data rate of transmission for streaming the flight data based on whether the at least one triggering condition has occurred according to the flight data;
   the antenna switch unit to select the at least one antenna to use for streaming the flight data according to the antenna selection signal; and
   the at least one antenna to use for streaming the flight data to stream the flight data at the data rate of transmission to at least one satellite.

13. The system of claim 12, wherein the at least one flight data unit is at least one of a flight data recorder (FDR) and a cockpit voice recorder/flight data recorder (CVR/FDR) combination recorder.

14. The system of claim 13, wherein when the at least one flight data unit is a FDR, the flight data is transmitted to the FDRS server via one of a digital flight data acquisition unit (DFDAU) playback bus or a FDR playback bus.

15. The system of claim 13, wherein when the at least one flight data unit is a CVR/FDR combination recorder, the flight data is transmitted to the FDRS server via one of an Ethernet hub or a CVR/FDR combination recorder playback bus.

16. The system of claim 12, wherein the first antenna is a crown antenna and the second antenna is an undercarriage antenna.

17. The system of claim 12, wherein the first antenna is a left saddlebag antenna and the second antenna is a right saddlebag antenna.

18. The system of claim 12, wherein the FDRS server determines the at least one antenna to use for streaming the flight data by analyzing the flight data to determine the at least one antenna that has visibility to at least one of the at least one satellite.

19. The system of claim 12, wherein when there are at least two of the antennas and the FDRS server determines that at least one of the at least one triggering condition has occurred, the FDRS server determines that all of the antennas are to be used for streaming the flight data.

20. The system of claim 12, wherein the at least one triggering condition is at least one of a rate of descent threshold has been exceeded, an attitude threshold has been crossed, a collision warning threshold has been exceeded, the aircraft has been sabotaged, the aircraft is flying in an unexpected matter, an adverse security condition exists onboard the aircraft, or a deviation from a flight plan threshold has been exceeded.

* * * * *